(12) United States Patent
Bratcher

(10) Patent No.: US 7,447,116 B2
(45) Date of Patent: Nov. 4, 2008

(54) DYNAMIC UNDERWATER POSITION TRACKING OF SMALL OBJECTS

(75) Inventor: Timothy W. Bratcher, Murfreesboro, TN (US)

(73) Assignee: Ionetrics, Inc, Murfreesboro, TN (US)

( * ) Notice: Subject to any disclaimer, the term of this patent is extended or adjusted under 35 U.S.C. 154(b) by 185 days.

(21) Appl. No.: 11/223,350

(22) Filed: Sep. 9, 2005

(65) Prior Publication Data

US 2007/0058489 A1    Mar. 15, 2007

(51) Int. Cl.
  *G01S 15/96* (2006.01)
(52) U.S. Cl. ..................................... 367/111
(58) Field of Classification Search ............... 367/111, 367/118
  See application file for complete search history.

(56) References Cited

U.S. PATENT DOCUMENTS

| | | | | |
|---|---|---|---|---|
| 4,312,053 | A | 1/1982 | Lipsky | 367/127 |
| 5,555,668 | A | 9/1996 | Brasseur | 43/43.15 |
| 5,563,849 | A | 10/1996 | Hall et al. | 367/127 |
| 6,820,366 | B1 | 11/2004 | McDermott | 43/42.22 |
| 2004/0105343 | A1* | 6/2004 | Betts et al. | 367/111 |
| 2007/0058489 | A1* | 3/2007 | Bratcher | 367/111 |
| 2007/0159923 | A1* | 7/2007 | Huff | 367/118 |

FOREIGN PATENT DOCUMENTS

JP       09294513 A   * 11/1997

OTHER PUBLICATIONS

Sonotronics Products Manual Spring 2005, Sonotronics, Revised Feb. 15, 2005.
Vemco A division of AMIRIX Systems, Inc. VR 100 Receivers, DT and IBDT transmitters-Depth Telemetry, V9P Coded transmitter, V7 coded pinger. Updated Oct. 27, 2004.

* cited by examiner

Primary Examiner—Dan Pihulic
(74) Attorney, Agent, or Firm—Floyd A. Gonzalez

(57) ABSTRACT

A system, method and program product for tracking the depth of small objects in which a transmitter is connected to a fishing line. The transmitter includes a sensor for measuring water pressure and transmits the pressure measurements to a receiver at a location remote from said transmitter. A signal processing unit is connected to the receiver and converts the transmitted pressure measurements into depth measurements. A display displays the depth measurements in real time showing the depth of the transmitter. The signal processing unit may include a wireless system for transmitting the depth measurement to a wireless display device associated with the fishing line to which the transmitter is connected.

29 Claims, 4 Drawing Sheets

DYNAMIC UNDERWATER POSITION TRACKING OF SMALL OBJECTS

FIELD OF THE INVENTION

This invention relates to tracking of small objects underwater, and more particularly to dynamic real time tracking of multiple small objects in a body of water.

BACKGROUND OF THE INVENTION

U.S. Pat. No. 4,312,053 issued Jan. 19, 1982 to Lipsky for RANGE AND DEPTH DETECTION SYSTEM discloses a method and apparatus for computing the range to and depth of a submerged object that either emits or reflects pulses of acoustic energy. A detecting array and related data handling apparatus measures as a function of time, the apparent angles of the arrival of the acoustic energy associated with each such pulse.

U.S. Pat. No. 5,555,668 issued Sep. 17, 1996 to Brasseur for METHOD AND DEVICE FOR LOCATING BAIT AT DESIRED DEPTH WHILE FISHING and discloses a bait locating device for accurately positioning bait adjacent a particular fish to be caught. The depth of the device is determined by an appropriate length of sinker line which is dependent upon the length of an employed hook snell and determined distance of fish from the bottom.

U.S. Pat. No. 5,563,849 issued Oct. 8, 1996 to Hall et al. for ACOUSTIC TRACKING SYSTEM and discloses an acoustic tracking system designed to allow scientists and fishermen to follow dolphins and whales without harming or harassing them. The system utilizes flow shielded hydrophones mounted on the bottom of a vessel in two arrays. Acoustic signals of interest strike the hydrophone piezo-electric elements and are transmitted to a receiver-display which determines and displays both the bearing to the signal of interest and the relative range from the vessel to that signal.

U.S. Pat. No. 6,820,366 B1 issued Nov. 23, 2004 to McDermott for AUTOMATICALLY ADJUSTABLE FISHING LURE discloses a fishing lure that is automatically adjustable in order to maintain the lure at an optimum depth in a body of water. The lure contains within the lure itself, a central processing unit, a sender/receiver, and a depth varying mechanism. In response to signals from the sender/receiver, the control processing unit sends signals to control the depth varying mechanism in order to maintain the lure at a constant distance from either the bottom or the surface of the body of water.

SUMMARY OF THE INVENTION

The present invention relates to a system for dynamic real time tracking of multiple small objects in a body of water. This system tracks artificial fishing lures and baited hooks for sport fishermen, but could be used for other purposes as well. The system includes a small underwater transmitter, an in-water receiver attached to an above water signal processing unit, and a networked suite of display devices. The size of the transmitter unit is small enough that it is embedded into existing fishing lures, attached to existing lures, attached to baited hooks, or attached to the fishing line at some location above the hook or lure. The transmitter measures water pressure, and transmits raw data by wireless telemetry to the receiver. The received signal is then processed to determine the depth of the transmitter below the surface of the water. In one embodiment, the ability to track multiple objects is achieved by transmitting coded messages from the transmitter. In another embodiment, multiple transmitters transmit messages with different frequencies. The signal processing unit displays information on both a wired display device, and multiple networked wireless devices. The networked devices can be either dumb displays with a wireless link, or PDAs or computers systems with native processing capability. The displays have the ability to report depth information keyed to a particular object, and to graphically display the orientation of this object relative to other objects being tracked. In the case of tracking multiple fishing lures or hooks from one boat, the ability to graphically link transmitter information to a particular rod and reel is also provided. The display device wired to the signal processing unit has a fixed location. The wireless devices have the capability to be mounted onto rods, and to be carried or worn by the fisherman. Other parameters such as water temperature, dissolved oxygen concentration, salinity, speed, or other measurements may be processed and displayed as well.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
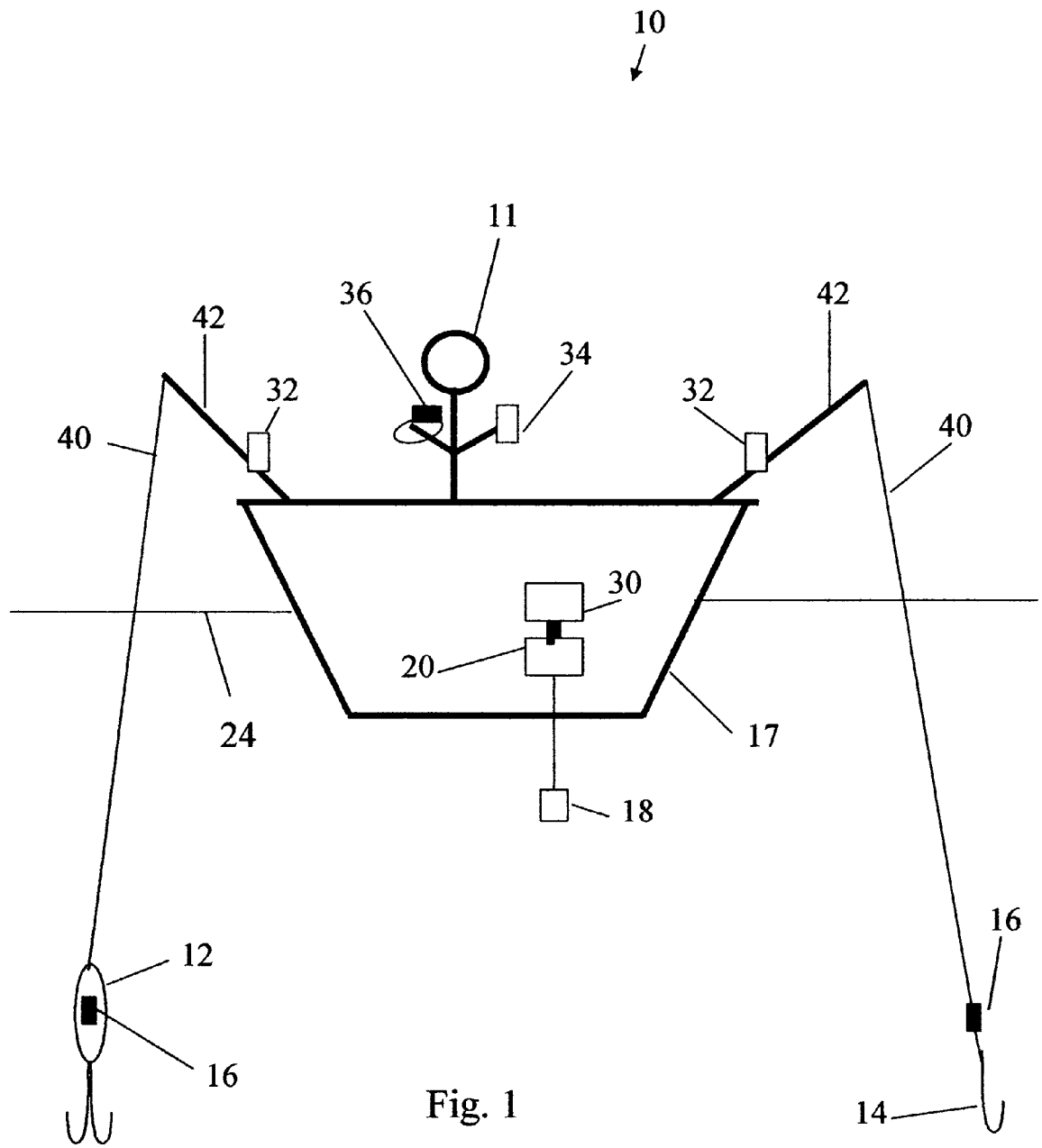
FIG. 1 is a schematic diagram of the system of the present invention having a transmitter attached to a fishing line, a receiver, a signal processing unit, a display wired to the signal processing unit, and wireless display units.

FIG. 1 illustrates a system 10 of the present invention for dynamic real time tracking of multiple small objects in a body of water. This system 10 may be used for tracking artificial fishing lures 12 or baited hooks 14 for sport fishermen 11, but could also be used for other purposes as well. The system 10 includes one or more small underwater pressure sensor/transmitters 16, an in-water receiver 18 attached to an above water signal processing unit 20 such as, for instance, in a boat 17, and a networked suite of one or more display devices 30, 32, 34, and 36. The size of the sensor/transmitter unit 16 is small enough that it can be embedded into a fishing lure 12, attached to lures (not shown), attached to baited hooks 14, or attached to the fishing line 40 at some location above the hook or lure. The sensor/transmitter 16 measures water pressure, and transmits raw data by wireless telemetry to the receiver 18. The received signal is then processed by a signal processing unit 20 to determine the depth of the transmitter 16 below the surface of the water 24. The ability to track multiple objects is achieved by transmitting coded messages from the transmitter 16. Another embodiment provides multiple transmitters 16 with different frequencies. The signal processing unit 20, which may include a digital processor such as a personal computer, has the ability to display information on both a wired display device 30, and multiple networked wireless devices 32, 34, and 36. The networked devices can be either dumb display with a wireless link, or PDAs, or computers systems with native processing capability. The displays 30, 32, 34, 36 have the ability to report depth information keyed to a particular object and to graphically display the orientation of this object relative to other objects being tracked. In the case of tracking multiple fishing lures or hooks from a boat 17, the ability to graphically and descriptively link transmitter information to a particular fishing line 40 and fishing pole 42 is provided. The display device 30 wired to the signal processing unit 20 will have a fixed location such as being mounted on the boat 17. The wireless devices will be provided with the capability to be mounted onto fishing poles such as at 32, or to be carried or placed in a pocket such as at 34, or worn as in a wristwatch or clipped to an article of clothing as shown at 36. Other parameters such as water temperature, dissolved oxygen concentration, salinity, speed, or other measurements may be processed and displayed as well.

The sensor/transmitter unit 16 may send acoustically coded messages and may be a V9P or similar coded transmitter available from VEMCO Limited, 100 Osprey Drive, Shad Bay, Nova Scotia, Canada. The receiver 18 may be either a VH165 omni-directional hydrophone, or a VH110 directional hydrophone available from VEMCO Limited. A VR100 Receiver, also available from VEMCO Limited, is connected to a laptop computer through a USB connection to form the signal processing unit 20. The display of the laptop provides the wired display device 30. The laptop computer has wireless capability which provides wireless links to PDA units, which may be the wireless display devices 32, 34, and 36. Since the ability to track multiple transmitters is provided, each sensor/transmitter 16 identifies itself with a unique code that is transmitted in a series of pulses of energy. Included in the transmission is the pressure data from the integrated pressure sensor. The sensor/transmitter 16 goes through the process of sending out synchronization pulses, identification code, and pressure information, followed by a delay before repeating the process.

Figure 2:
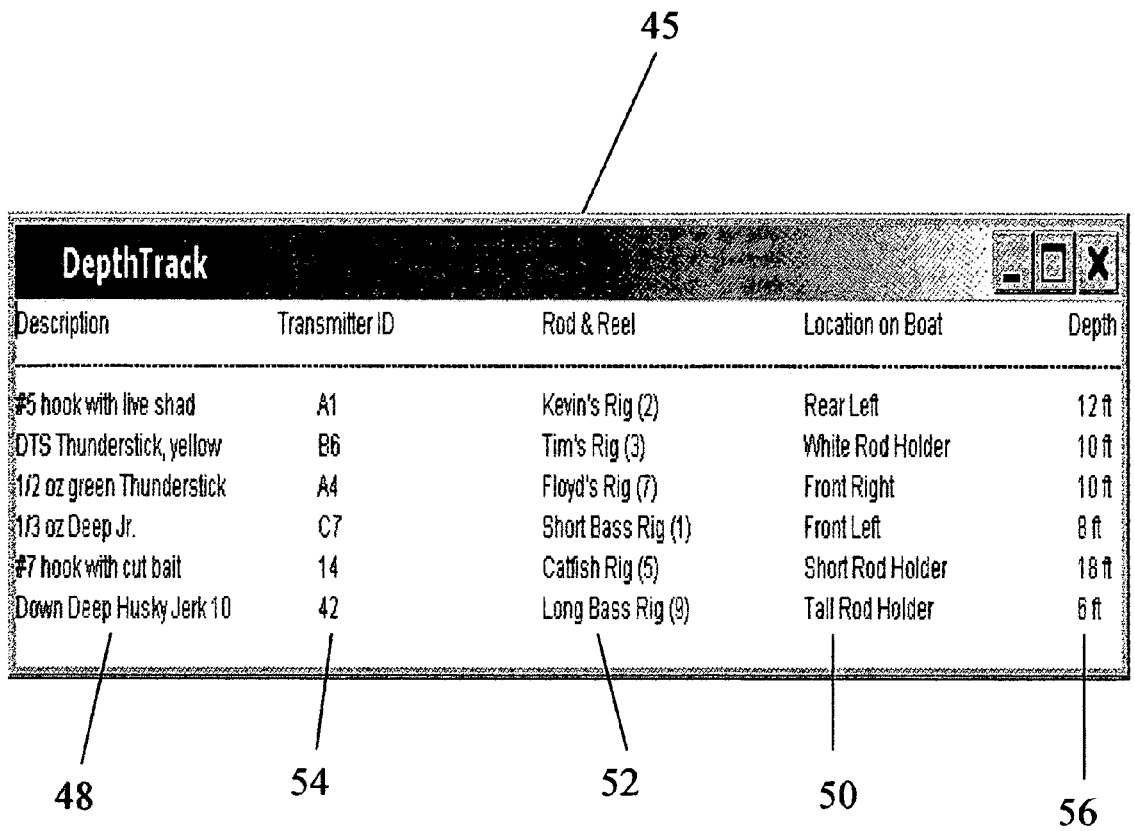
FIG. 2 illustrates a screen capture of a spreadsheet table embodiment displayed by a display of the system of FIG. 1.
Figure 3:
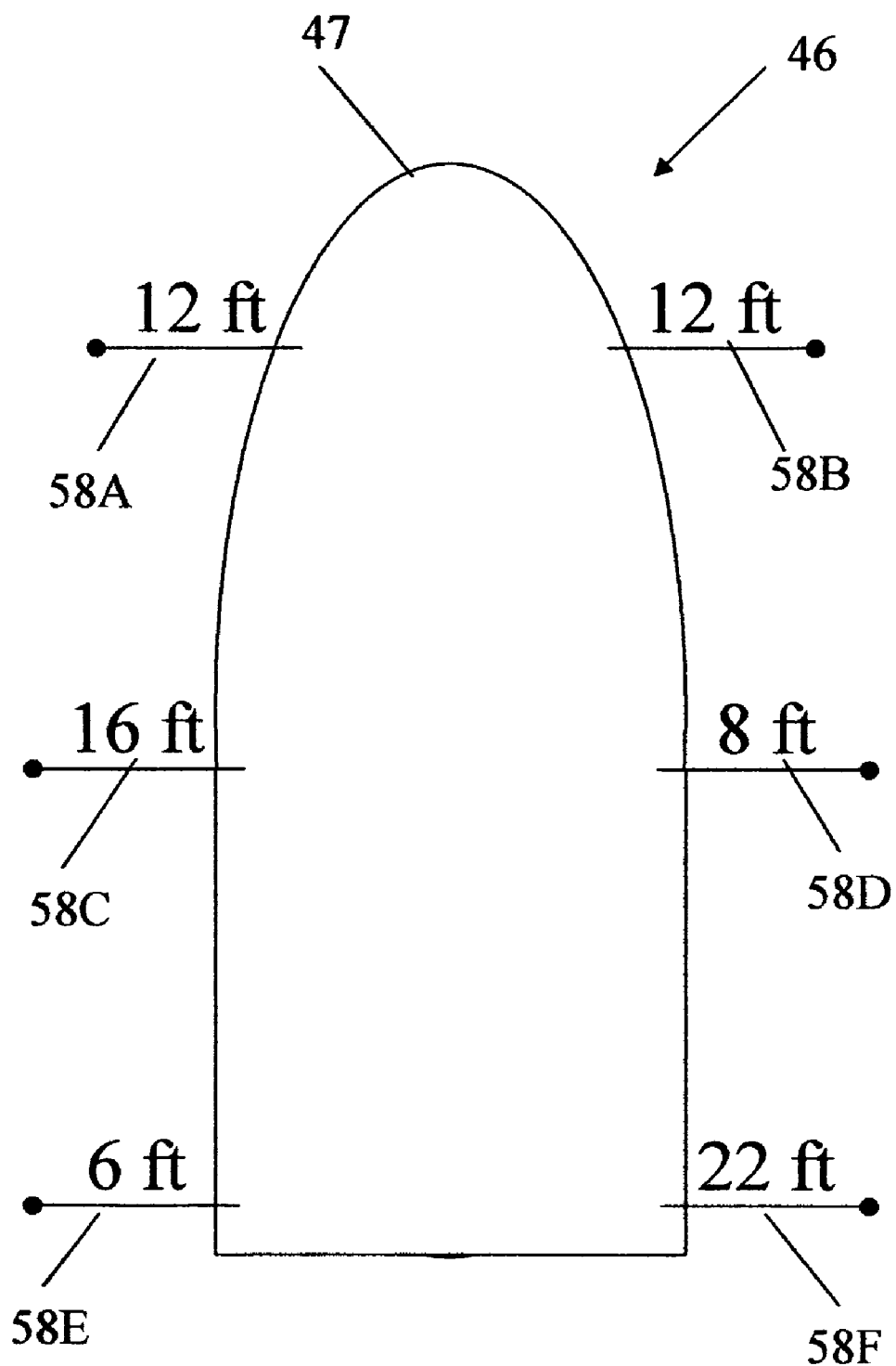
FIG. 3 illustrates a screen capture of a graphical drawing embodiment displayed by a display of the system of FIG. 1.

Two basic types of data presentation are provided, a graphical drawing and a table based spreadsheet. Any of the display devices can display either type of data presentation. FIG. 2 illustrates a screen capture of a spreadsheet based table 45, and FIG. 3 illustrates a screen capture of the display of one of a graphical drawing 46. Either of the displays of FIG. 2 or FIG. 3 will have the option of adding or removing information, regardless of the number of objects actually being tracked. The wireless displays 32, 34, and 36 will have the capability of being carried or worn by persons on the boat 17, and of being connected directly to a fishing pole 42. The display in FIG. 2 shows a spreadsheet view 45 of the objects being tracked. This view can be shown on either the wired or wireless display devices, and fishing pole combinations can be added or removed. A setup mode allows entry of a descriptive text string for each of the objects. The object "Description" 48 and "Location on Boat" 50 columns are optional and can be removed if desired. The spreadsheet also includes a "Rod & Reel" column 52, a "Transmitter ID" column 54 to identify the transmitter sending data, and a "Depth" column 56 to display the depth calculated by a calculator function of the signal processing unit 20 from pressure data transmitted by the sensor of each sensor/transmitter unit 16. It will be understood that the depth displayed can be calibrated to take into account the distance from the hook or lure to the sensor/transmitter unit 16, and/or the distance between the receiver 18 and the surface of the water 24. The graphical display in FIG. 3 shows a boat outline 47 with six rod and reel combinations 58A-58F. The physical location of the rod and reel on the boat can be moved on the display to represent movement on the boat, and rod and reels 52 can be added or removed from the display, to reflect the actual fishing configuration, as desired. A setup mode allows the transmitter associated with a particular fishing pole to be changed. The calculated depth for each rod and reel 58 is displayed associated with each of the rods and reels, as shown.

Figure 4:
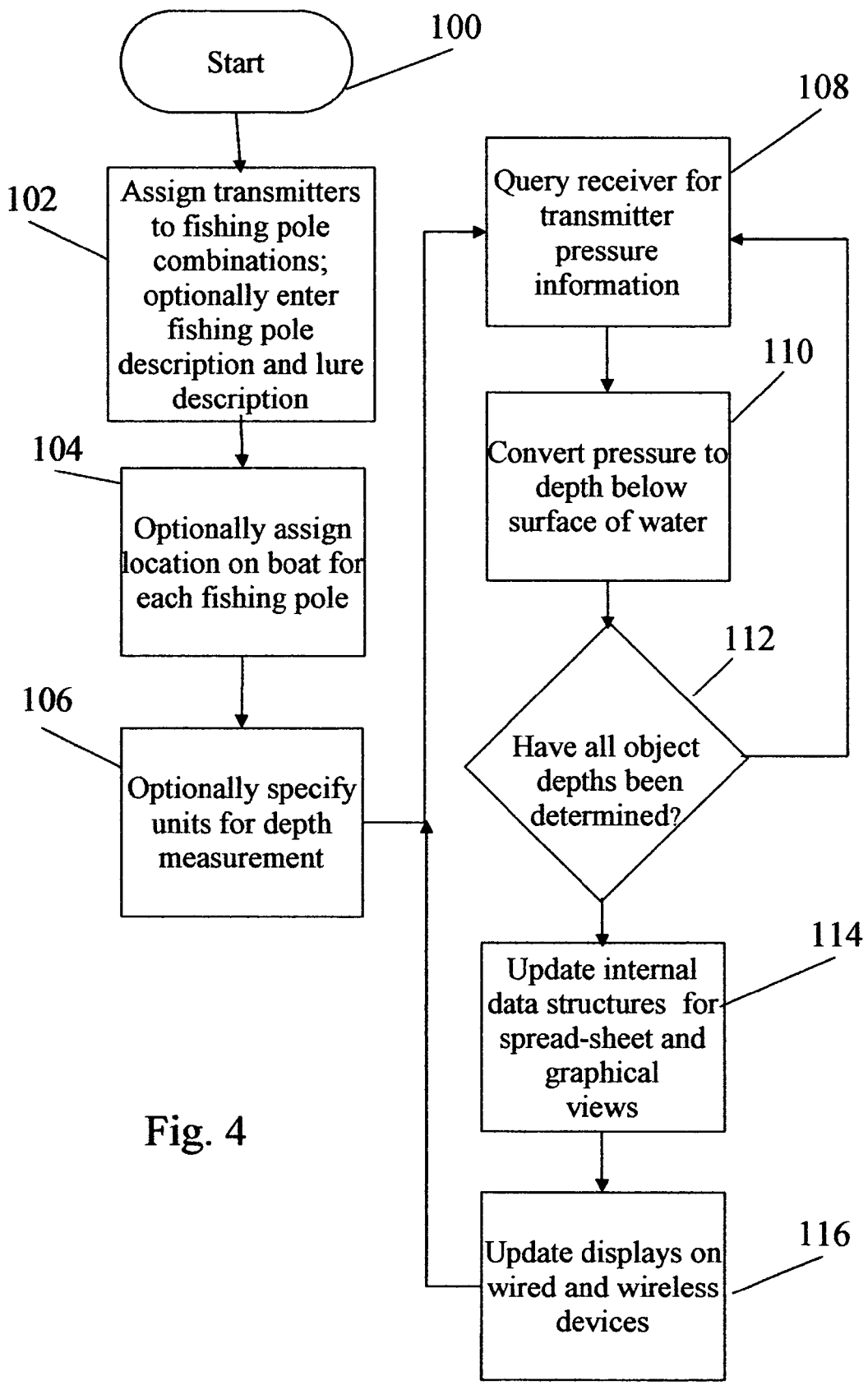
FIG. 4 is a flowchart of a program of the signal processing unit of FIG. 1.

FIG. 4 is a flowchart of software in the signal processing unit 18 which processes the data from each sensor/transmitter unit 16. The software starts at start 100. After startup 100, each transmitter is assigned an object description and fishing pole association at 102. An optional description for the fishing pole can also be entered at 102. At 104, a location on the boat for each fishing pole may be assigned. The location entry can be in the form of a text string for the spreadsheet view 45 of FIG. 2 or the interactive drawing of the graphical view 46 of FIG. 3. Data entry can be made from either the fixed or wireless display devices. System setup information is saved to memory for use as default settings for subsequent outings. In addition to basic setup and geometry information, the depth measurement units can also be set at 106. After entry of setup information, the pressure data for each object being tracked is read at 108, and then converted from raw pressure data to depth in the specified units at 110. A check is made at 112 to determine if all abject depths have been determined. Steps 108 and 110 are repeated for all of the objects being tracked. After all object depths have been determined, internal data structures for the spreadsheet and graphical views are updated at 114, and the displays for all wireless devices are updated at 116. After the displays are updated, the program returns to 108 to update the depth pressure for each object, as described. The depth pressure for each object is updated as described during a predetermined time interval, such as at least once per second.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for tracking the depth of small objects comprising:
    an identification generator for generating an identification signal associated with a fishing line;
    a transmitter connected to the fishing line, said transmitter transmitting pressure measurements;
    a receiver at a location remote from said transmitter for receiving said transmitted pressure measurements and the identification signal identifying the fishing line;
    a signal processing unit connected to said receiver for converting said transmitted pressure measurements into depth measurements; and
    a display for displaying said depth measurements in real time showing the depth of said transmitter and for displaying the identification associated with the fishing line.

2. The system according to claim 1 wherein said transmitter transmits said pressure measurements in acoustically coded messages.

3. The system according to claim 2 wherein said receiver is a hydrophone for receiving acoustically transmitted messages.

4. The system according to claim 1 wherein said display includes a display connected to said signal processing unit.

5. The system according to claim 1 wherein said signal processing unit includes a wireless link for the wireless transmission of said depth measurements, and
    said display includes a wireless display for receiving and displaying said wireless transmission of said depth measurements.

6. The system according to claim 5 wherein said wireless display is attached to a fishing rod holding the fishing line to which said transmitter is attached.

7. The system according to claim 5 further comprising a plurality of transmitters, wherein each transmitter transmits an identification, and said signal processing unit calculates the depth of each transmitter according to said identification; and
    wherein said display comprises a plurality of wireless displays, each wireless display for displaying the depth of a particular one of said plurality of transmitters.

8. The system according to claim 7 wherein each of said transmitters is connected to a separate fishing line, and each of said wireless displays is associated with one of said fishing lines and displays the depth of the transmitter connected to its respective fishing line.

9. A method for tracking the depth of small objects comprising:
    generating an identification signal associated with a line;
    transmitting pressure measurement from a transmitter connected to the line extending from the surface of a body of water to an object to be tracked;
    receiving said transmitted pressure measurements at a receiver at a location remote from said transmitter;
    converting said transmitted pressure measurements into depth measurements by a signal processing unit connected to said receiver; and
    displaying on a display, the identification associated with the line and said depth measurements in real time showing the depth of said transmitter.

10. The method according to claim 9 wherein said pressure measurements are transmitted in acoustically coded messages.

11. The method according to claim 10 wherein said transmitted pressure measurements are received by a hydrophone for receiving acoustically transmitted messages.

12. The method according to claim 9 further comprising displaying said depth measurements on a display connected to said signal processing unit.

13. The method according to claim 9 further comprising transmitting said depth measurements on a wireless link for the wireless transmission, and
    receiving and displaying on a wireless display unit said wireless transmission of said depth measurements.

14. The method according to claim 13 further comprising displaying said depth measurements on a wireless display unit attached to a fishing rod holding the line to which said transmitter is attached.

15. The method according to claim 14 further comprising;
    transmitting from a plurality of transmitters, an identification and pressure measurement from each transmitter in said plurality of transmitters;
    calculating with said signal processing unit, the depth of each transmitter according to said identification; and
    displaying the depth of a particular one of the transmitters on one wireless display of a plurality of wireless displays.

16. The method according to claim 15 wherein each of said transmitters is connected to a separate line of a plurality of lines, and each of said wireless displays is associated with one of said lines and displays the depth of the transmitter connected to its respective line.

17. A program product usable with a system for tracking the depth of small objects comprising an identification generator for generating an identification signal associated with a fishing line and a transmitter connected to the line which extends from the surface of a body of water to an object to be tracked, said transmitter transmitting pressure measurements and a receiver at a location remote from said transmitter for receiving said transmitted pressure measurements, said program product comprising:
    a computer readable medium having recorded thereon computer readable program code performing the method comprising:
    converting the identification signal to an identification associated with the fishing line;
    converting said transmitted pressure measurements into depth measurements; and
    displaying on a display, the identification associated with the fishing line and said depth measurements in real time showing the depth of said transmitter.

18. The program product of claim 17 wherein the method further comprises displaying said depth measurements on a display with associated descriptive data identifying said transmitter.

19. The program product of claim 17 wherein the method further comprises transmitting said depth measurements on a wireless link for the wireless transmission, and
    receiving and displaying on a wireless display unit said wireless transmission of said depth measurements.

20. The program product according to claim 17 further comprising displaying said depth measurements on a wireless display unit attached to a fishing rod holding the line to which said transmitter is attached.

21. The program product according to claim 20 wherein the method further comprises:

providing a plurality of transmitters each of which transmits an identification and pressure measurement;

calculating the depth of each transmitter according to said identification; and displaying the depth of a particular one of the transmitters on one wireless display of a plurality of wireless displays.

22. The program product according to claim 21 wherein in said method further comprises:

connecting each of the transmitters to a separate line of a plurality of lines, and each of said wireless displays is associated with one of said lines; and displaying the depth of each transmitter and an identification of its respective line.

23. A system for tracking the depth of small objects comprising:

a receiver for receiving pressure measurements from a remote transmitter connected to a line extending from the surface of a body of water to an object to be tracked;

a signal processing unit connected to said receiver for converting said transmitted pressure measurements into depth measurements, said signal processing unit including a wireless link for the wireless transmission of said depth measurements; and a display for displaying said depth measurements in real time showing the depth of the transmitter;

wherein said receiver receives signals from a plurality of transmitters, wherein each transmitter transmits an identification, and said signal processing unit calculates the depth of each transmitter according to said identification; and wherein said display includes a wireless display for receiving and displaying said wireless transmission of said depth measurements, and further comprises a plurality of wireless displays, each wireless display for displaying the depth of a particular one of said plurality of transmitters.

24. The system according to claim 23 wherein said receiver decodes pressure measurements from the transmitter in acoustically coded messages.

25. The system according to claim 24 wherein said receiver is a hydrophone for receiving acoustically transmitted messages.

26. The system according to claim 23 wherein said display includes a display connected to said signal processing unit.

27. The system according to claim 23 wherein said wireless display is attached to a fishing rod holding the line to which said transmitter is attached.

28. The system according to claim 23 wherein each of said transmitters is connected to a separate line, and each of said wireless displays is associated with one of said lines and displays the depth of the transmitter connected to its respective line.

29. A fishing lure for use with a system that tracks the depth of the fishing lure, said fishing lure comprising;

a body;

an identification generator for generating an identification signal;

a pressure sensor in said body for measuring the pressure of water surrounding the body; and a transmitter in said body connected to said identification generator and said pressure sensor, said transmitter for transmitting the identification signal of said identification generator and measurements of said pressure sensor to the system such that the identification of the fishing lure and the depth of the fishing lure may be tracked.

* * * * *